US009786122B2

(12) United States Patent
Burnside

(10) Patent No.: US 9,786,122 B2
(45) Date of Patent: Oct. 10, 2017

(54) METHOD AND APPARATUS FOR ELECTRONIC GAMING

(71) Applicant: Jack Ten Suited, Dallas, TX (US)

(72) Inventor: Robert Burnside, Houston, TX (US)

(73) Assignee: Jack Ten Suited, Houston, TX (US)

( * ) Notice: Subject to any disclaimer, the term of this patent is extended or adjusted under 35 U.S.C. 154(b) by 0 days.

(21) Appl. No.: 15/362,436

(22) Filed: Nov. 28, 2016

(65) Prior Publication Data

US 2017/0076533 A1 Mar. 16, 2017

Related U.S. Application Data

(63) Continuation of application No. 14/579,467, filed on Dec. 22, 2014, now Pat. No. 9,514,603, which is a (Continued)

(51) Int. Cl.
*A63F 13/00* (2014.01)
*G07F 17/32* (2006.01)
*G07F 17/34* (2006.01)

(52) U.S. Cl.
CPC ........ *G07F 17/323* (2013.01); *G07F 17/3218* (2013.01); *G07F 17/3225* (2013.01);
(Continued)

(58) Field of Classification Search
None
See application file for complete search history.

(56) References Cited

U.S. PATENT DOCUMENTS 5,752,702 A 5/1998 McDoniel
6,375,567 B1 4/2002 Acres
(Continued)

FOREIGN PATENT DOCUMENTS

CA 2280194 A1 2/2001
CA 2632291 A1 7/2007
(Continued)

OTHER PUBLICATIONS

Party Poker.net, "Texas Hol❋ em," 2013 Interskill Games Limited, http://www.partypoker.net/how_to_play/poker_school/poker_games/texas_holdem.html, pp. 1-3.
(Continued)

*Primary Examiner* — Jason Yen
(74) *Attorney, Agent, or Firm* — Slater Matsil LLP

(57) ABSTRACT

A system and method for controlling a player's rate of play is provided. In an embodiment, a rate of play is defined that influences when a player is transferred to a new hand, such as upon folding or when play in a current hand is completed. Rate of play may be expressed, for example, as a percentage of hands to transfer upon which the player is to be moved upon folding. In another embodiment, a player may select, for example, a "Fold and Transfer" option or a "Fold and Observe" option, thereby allowing the player to better control the rate of play. In yet another embodiment, a player may designate a rate of play and be presented with a "Fold and Transfer" option and/or a "Fold and Observe" option, wherein the "Fold and Transfer" option and/or the "Fold and Observe" option may override the designated rate of play.

20 Claims, 7 Drawing Sheets

Related U.S. Application Data continuation of application No. 13/800,549, filed on Mar. 13, 2013.

(52) U.S. Cl.
CPC ...... *G07F 17/3227* (2013.01); *G07F 17/3251* (2013.01); *G07F 17/3293* (2013.01); *G07F 17/34* (2013.01); *G07F 17/3262* (2013.01)

(56) References Cited

U.S. PATENT DOCUMENTS

| | | | | |
|---|---|---|---|---|
| 6,390,474 | B1 | 5/2002 | Terminel | |
| 6,416,407 | B1 | 7/2002 | Carrico | |
| 6,481,717 | B1 | 11/2002 | Richardelle | |
| 6,575,831 | B1 | 6/2003 | Gonen | |
| 6,902,166 | B2 | 6/2005 | Stern | |
| 8,152,618 | B1 * | 4/2012 | Blay | G07F 17/3272 463/13 |
| 2002/0123377 | A1 | 9/2002 | Shulman | |
| 2003/0070178 | A1 | 4/2003 | Boyd | |
| 2003/0073494 | A1 | 4/2003 | Kalpakian | |
| 2004/0017043 | A1 | 1/2004 | Moody | |
| 2004/0036217 | A1 | 2/2004 | Schlumbrecht | |
| 2004/0082384 | A1 * | 4/2004 | Walker | G07F 17/32 463/40 |
| 2004/0132521 | A1 | 7/2004 | Peterson | |
| 2004/0183254 | A1 | 9/2004 | Schlumbrecht | |
| 2005/0116416 | A1 | 6/2005 | Peterson | |
| 2005/0215300 | A1 | 9/2005 | Oliveras | |
| 2006/0068864 | A1 | 3/2006 | White | |
| 2006/0287104 | A1 | 12/2006 | White | |
| 2007/0155460 | A1 | 7/2007 | Burnside | |
| 2008/0026826 | A1 | 1/2008 | Groswirt | |
| 2008/0280663 | A1 | 11/2008 | Shar | |
| 2008/0318656 | A1 * | 12/2008 | Walker | G07F 17/32 463/20 |
| 2009/0005150 | A1 * | 1/2009 | Haveson | G07F 17/32 463/20 |
| 2009/0023488 | A1 | 1/2009 | Lewis | |
| 2009/0189351 | A1 | 7/2009 | Baerlocher | |
| 2010/0029356 | A1 | 2/2010 | Parry | |
| 2010/0279764 | A1 | 11/2010 | Allen | |
| 2010/0304818 | A1 * | 12/2010 | Blake | G07F 17/32 463/13 |
| 2011/0130184 | A1 | 6/2011 | Mills | |
| 2012/0077559 | A1 | 3/2012 | Sestak et al. | |
| 2012/0077571 | A1 | 3/2012 | Amaitis | |
| 2012/0196688 | A1 | 8/2012 | Karsten | |
| 2012/0270637 | A1 | 10/2012 | Lutnick et al. | |
| 2013/0178262 | A1 | 7/2013 | Wilkinson et al. | |
| 2013/0231168 | A1 | 9/2013 | Rogers | |
| 2014/0128138 | A1 | 5/2014 | Wickett et al. | |

FOREIGN PATENT DOCUMENTS

| | | | |
|---|---|---|---|
| EP | 1968720 | | 9/2008 |
| WO | 9964128 | A1 | 12/1999 |
| WO | 03011407 | A1 | 2/2003 |
| WO | 2004004853 | A2 | 1/2004 |
| WO | 2004071601 | A2 | 8/2004 |
| WO | 2005033825 | A2 | 4/2005 |
| WO | 2007059310 | A2 | 5/2007 |
| WO | 2007078372 | A2 | 7/2007 |
| WO | 2009100582 | A1 | 8/2009 |

OTHER PUBLICATIONS

Party Poker.net, "Omaha," 2013 Interskill Games Limited, http://www.partypoker.net/how_to_play/poker_school/poker_games/omaha_html, pp. 1-3.

Party Poker.net, "7 Card Stud," 2013 Interskill Games Limited, http://www.partypoker.net/how_to_play/poker_school/poker_games/7cardstud.html, pp. 1-3.

Party Poker.net, "7 Card Stud Hi/Lo," 2013 Interskill Games Limited, http://www.partypoker.net/how_to_play/poker_school/poker_games/7cardstud_hi_lo.html, pp. 1-3.

Party Poker.net, Information Sheet, 2013 Interskill Games Limited, http://www.partypoker.net, pp. 1-2.

PokerStars.net, Information Sheet, http://www.pokerstars.net, pp. 1-3.

* cited by examiner

METHOD AND APPARATUS FOR ELECTRONIC GAMING

This application is a continuation of, and claims the benefit of, U.S. patent application Ser. No. 14/579,467, filed on Dec. 22, 2014, titled "Method and Apparatus for Electronic Gaming," which is a continuation of, and claims the benefit of, U.S. patent application Ser. No. 13/800,549, filed on Mar. 13, 2013, titled "Method and Apparatus for Electronic Gaming", which applications are hereby incorporated herein by reference.

TECHNICAL FIELD

The present disclosure relates generally to electronic gaming devices and systems, and more particularly to a system and method for online gaming.

BACKGROUND

In a normal game of poker, people sit together at a table with a deck of cards. Each player takes a turn dealing the cards clockwise beginning at the left of the dealer until all players have a designated number of cards. The player to the left of the dealer who receives the first card will deal the next hand.

In professional games at card rooms, a separate person referred to as the "dealer" physically deals the cards, but he does not play. Since the deck resides with the stationary dealer, a round disk called a dealer's button or simply the "button," is placed in front of the player sitting in the dealer's seat. For rounds after the first round of a hand, the person on the button or dealer's seat has an advantage, because he acts last on his hand after viewing the actions of the other players. For the first round, the player who puts up the largest ante or straddle buys the advantage of being the last to act, albeit at a price. In card rooms generally the names of new players are put a list or queue, and they have to wait for an opening at a table or until there are enough new players to set up a new table before they can be seated and begin playing. In card rooms, active players can generally request a transfer to another table that has a vacant seat.

Many people are now playing poker on the Internet. A number of companies host games by having a website or URL, such as Party Poker and Poker Stars. The host sites generally offer a variety of games, and the number of players in a game will vary. The same type of game may be offered with a different maximum number of players. The lower the maximum number of players, the less the quality of the hand necessary to "call" and the faster the game. Where fifty-five hands an hour might be played in a nine player game, one hundred hands an hour might be played in a six player game.

A popular online poker game in the United States is Hold 'Em, and at times it comprises approximately eighty percent of the online games played. Four other popular games with a smaller percentage of the market include Four Card Omaha High, Four Card Omaha 80B (high-low eight or better), Seven Card Stud High and Seven Card Stud 80B. Other U.S. games comprise a smaller percentage of the market. The relative popularity of these and other games typically changes over time. There are also numerous other poker games, including foreign poker games.

In poker games, it is possible for two or more people to play together in collusion (a form of cheating). To do this, the players may use signals designed to keep other players from discovering their scheme. Although Internet and other organizations providing electronic play do their best to eliminate collusion, it can be a major problem. In some cases an online poker player can play two hands at the same table under two different names. The cheater may login by dialing different servers using different login names. The servers may have different Internet or IP addresses, and there is no reliable method for identifying or tracking a person playing under two different names at the same table.

Besides collusion, another problem with poker play is boredom. Players typically respond serially in a clockwise fashion, each being forced to wait his turn, even if the player just intends to fold. Then, when a player's turn comes and he folds, he has to wait for the hand to end before he becomes active again. In some cases, online poker sites attempt to allow players to remain more active by letting players play at more than one table at a time. To do this, a player may open a second window and play at two different tables at the same time. This activity, referred to as "double dipping" in poker jargon, does afford a player more action by allowing him to play twice as many hands per hour. However, it is not seamless. There are frequent times when the player is idle at both tables, and there are times when he will need to respond concurrently at both tables. In other cases, online poker sites move players to the next available new table when the player becomes inactive either by folding or remaining in the hand until the end. This type of game is generally over twice as fast when compared to a game where folded players remain at the same table until the completion of the hand. Some players find this type of game too fast because the action is continuous.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use various embodiments, and do not limit the scope of the invention.

Generally, some embodiments relate to a method or system for providing a game. As such these embodiments can be considered to relate to a device or machine system for playing a game. The game may be, for example, the game of poker or some other game in which hands are played.

Figure 1:
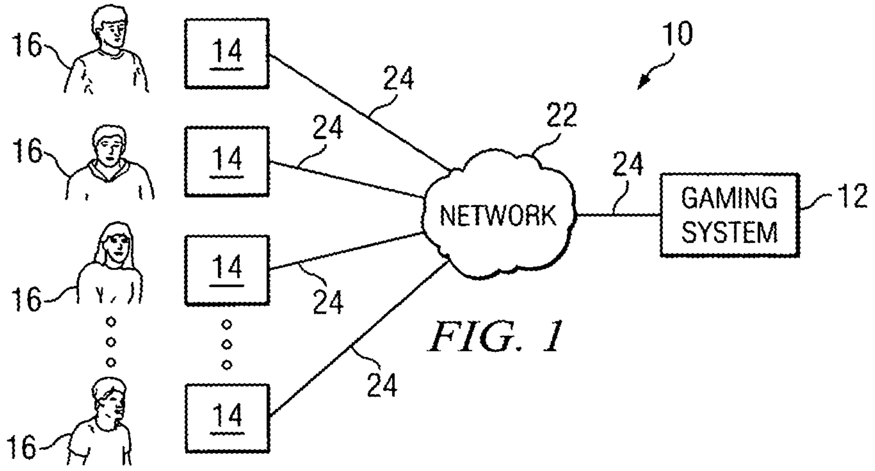
FIG. 1 illustrates a gaming network, in accordance with a particular embodiment.

FIG. 1 is illustrates a gaming network 10, in accordance with a particular embodiment. Gaming network 10 comprises a gaming system 12 and a plurality of access elements 14. Gaming system 12 is coupled to access elements 14 through a communication network 22. Communication network 22 allows gaming system 12 and access elements 14 to communicate with each other through a plurality of communication links 24. In particular embodiments, gaming system 12 may be provided and maintained by a gaming company or organization. Access elements 14 allow users to access gaming system 12 through communication network 22.

Gaming system 12 provides various games for play by users 16 accessing gaming system 12 through access elements 14. In particular embodiments, these games may include electronic poker games such as Hold 'Em, Omaha, Omaha Hi-Low, Seven Card Stud and Seven Card Stud Hi-Low. Gaming system 12 may also provide other games, including Asian and other foreign games. Users 16 may play games provided through gaming system 12 for free, for money or for various other prizes, such as coupons, discounts and merchandise. In some games, the user may bet or wager real money or points or other items with or without monetary value. In the case of wagering and playing for money, a user may deposit money in an account with gaming system 12 by check, credit card, wire transfer or any other method. Once money is in a player's account with the gaming system, the player may purchase "chips" to be used in a game, up to the amount he has on deposit.

In particular embodiments, players are moved to different tables based on the player's availability in a game. For example, upon folding their cards a player at one table may be moved (for example, through a queue or directly) to another table to begin a new hand. Therefore, the player may not have to wait until the end of the hand at the table at which he folded before continuing play in another hand. This functionality helps to reduce collusion by a player or several players, because it inherently separates collusive players who normally sit at the same table. By transferring folding players to other tables, players who are partnering or playing two or more seats will not be able to consistently play at the same table. As the number of tables increases, the process of seating idle players may create a larger number of active tables, and a player may seamlessly play more hands over an equal timeframe when compared to a conventional game. Given the increased action of multiple active tables in the virtual table format, if the game is a real money game featuring a rake from the pot for the game provider, then more money may be raked as compared to a conventional table format.

In the illustrated embodiment, communication network 22 enables communication between access elements 14 and gaming system 12, all of which may be distributed across multiple cities and geographic regions. Network 22 may comprise a one or more or partial wide area networks (WANs), public switched telephone networks (PSTNs), local area networks (LANs), the Internet or any other communications and data exchange networks or systems that enable communication between communication system elements, including public or private wireline or wireless networks. For example, in particular embodiments, some access elements 14 may communicate with gaming system 12 over the Internet, while other access elements 14 may communicate with gaming system 12 over a LAN. Network 22 may also comprise any of a number of network components to enable communication between elements as described herein. Such network components may include gate keepers, call managers, routers, hubs, switches, gateways, endpoints or other hardware, software or embedded logic implementing any number of communication protocols that allow for the exchange of data in gaming network 10. The term "communication network" should be interpreted as generally defining any network capable of transmitting audio and/or video telecommunication signals, data and/or messages. Generally, communication network 22 provides for the communication of packets, cells, frames, or other portions or data or information between and among gaming system 12 and access elements 14. In particular embodiments, communication network 22 employs communication protocols that allow for the addressing or identification of access elements, nodes and/or systems coupled to network 22. For example, using internet protocol (IP), each of the components coupled together by communication network 22 may be identified using IP addresses. In this manner, communication network 22 may support any form and/or combination of point-to-point, multicast, unicast or other techniques for exchanging media data and information among components of gaming network 10. Any network components capable of exchanging audio, video or other data using frames, packets or otherwise may be included within the scope of particular embodiments.

Access elements 14 may each be associated with one or more users of gaming system 12. Access elements 14 may include any combination of hardware, software and/or encoded logic that provides communication services to a user. For example, access elements 14 may include a telephone, a computer running telephony software, a video monitor, a personal computer, a camera, an IP phone, a cell phone, a personal digital assistant (PDA) or any other communication hardware, software and/or encoded logic that supports the communication of data or information with gaming system 12 through communication network 22. Access elements 12 may also include unattended or automated systems, gateways, other intermediate components or other devices that can establish media sessions. In particular embodiments, gaming system 12 provides a website that makes information and programming stored at gaming system 12 available to access elements 14. Access elements 14 may access gaming system 12 information, files and functionality using a Uniform Resource Locator (URL) of the website. The website may include web pages that may comprise text, images, sounds, animations and other information. In particular embodiments, access elements 14 may operate software to act as an interface between users 16 and gaming system 12. In some cases this software may generally be referred to as "thin" or "dumb" software in situations where management and control of various games resides in gaming system 12.

Communication links 24 connecting access elements 14 and gaming system 12 to network 22 may comprise any type of communication links capable of supporting data transfer, such as wireline or wireless links. In particular embodiments, communication links 24 may comprise, alone or in combination, cable links, Digital Subscriber Line (DSL) links, Integrated Services Digital Network (ISDN) links, Asymmetric Digital Subscriber Line (ADSL) links, T1 or T3 communication lines, wireless communication links, hardware lines, telephone links or other suitable types of data communication links. Communication links 24 may also connect to a plurality of intermediate servers or other components between communication network 22 and gaming system 12 and between communication network 22 and access elements 14.

Figure 2:
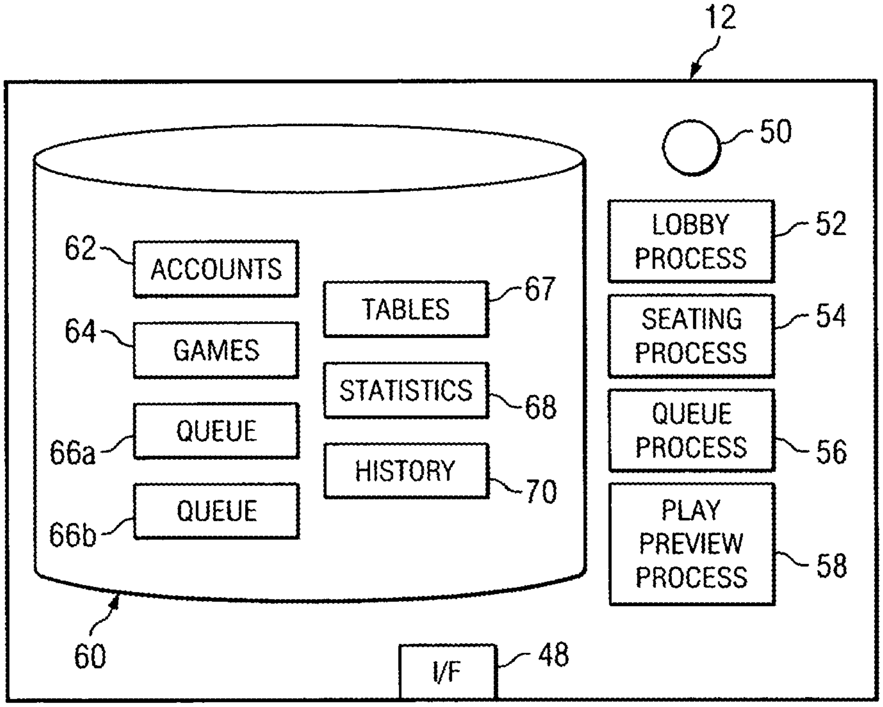
FIG. 2 illustrates a gaming system of FIG. 1, in accordance with a particular embodiment.

FIG. 2 illustrates gaming system 12, in accordance with a particular embodiment. Gaming system 12 includes an interface 48, a processor 50, a lobby process 52, a seating process 54, a queue process 56, a play review process 58 and a memory 60. Particular embodiments may include a gaming system have none, some or all of the same or similar components as those described herein to perform various functionality described herein.

Interface 48 couples gaming system 12 with communication network 22 and is operable to receive communications from and transmit communications to communication network 22. Processor 50 may be a microprocessor, controller, or any other suitable computing device, resource, or combination of hardware, software and/or encoded logic operable to provide, either alone or in conjunction with other components of gaming system 12, functionality of gaming system 12. Such functionality may include controlling, managing and providing various features discussed herein to a plurality of users, such as users of access elements 14 accessing the gaming system.

Memory module 60 may be any form of volatile or non-volatile, computer-readable memory including, without limitation, magnetic media, optical media, random access memory (RAM), read-only memory (ROM), removable media, or any other suitable local or remote memory component. Memory module 60 may store any suitable data or information, including software and encoded logic, utilized by gaming system 12. In the illustrated embodiment, memory module 60 includes accounts 62, games 64, queues 66*a* and 66*b*, tables 67, statistics 68 and history 70. Gaming systems in other embodiments may include memory that includes some, none or all of the same or similar components as those described with respect to memory module 60.

Accounts 62 generally include information relating to various players who have an account with gaming system 12. Such information may include, for example, a player's history of play, account balance (e.g., in terms of money, chips, points or otherwise), profile, current play information (e.g., table or queue status) or any other suitable information. Games 64 generally include information associated with games that may be provided through gaming system 12. Such information may include, for example, gaming software, rules, options, procedures, configurations and other information associated with games provided.

Queues 66 generally store players waiting to join tables associated with games of gaming system 12. Queues 66 may store any suitable information associated with the players in the queues, such as information described below that may be used with various queue and seating process functionality. Particular embodiments may include any suitable number and/or type of queues for various situations. For example, each queue may be associated with a particular type of game offered through gaming system 12. One of the queues may comprise player identifications who are waiting to be transferred to another table, and this queue may be referred to as the Player Transfer Queue. Tables 67 may generally include information associated with various tables of various games. For example, such information may include number of tables, current players at tables, game status information of tables, table betting parameters and any other suitable information to provide the functionality described herein.

Statistics 68 generally includes statistical information kept by gaming system 12, such as game statistics, player statistics, situational statistics related to games and/or players in various situations and any other suitable statistical information. Statistics 68 may keep detailed player statistics that help define a player's skill level, such as statistics regarding a player's aggressiveness, folding percentage and raise percentage. In some embodiments statistics for a particular player may be made available to other players either during or outside of a particular game. History 70 generally includes historical information associated with gaming system 12, such as game history, player history, recorded games and recorded hands or situations.

Lobby process 52, seating process 54, queue process 56 and play review process 58 may comprise suitable hardware, software or encoded logic processes, algorithms or methods executed by gaming system 12, for example in conjunction with processor 50. Gaming systems in other embodiments may provide similar or different processes to execute some or all of the functionality described herein.

Various functionality of gaming system 12 that may be provided in one or more embodiments is described herein. This functionality may be provided in any of a number of suitable games, such as various poker games and bridge. Particular games which may benefit from embodiments described herein include games with multiple players where the play progresses serially, where there may be some idling of players and some intellectual pauses.

In particular embodiments, a user 16 may log-in to gaming system 12 by keying in a unique login name, which may ultimately be displayed at the user's selected seat at a poker table. In some embodiments, when a player indicates he wishes to play a particular game for the very first time, lobby process 52 may create a player record in accounts 62. In particular embodiments, as further discussed below, to control the player's seating a "projected-next-seat-number" variable or indicator may be associated with the player. For a first time player playing particular games such as Hold 'Em, lobby process 52 may set the player's "projected-next-seat-number" in his account 62 to the big blind or seat number two to influence the seating algorithm such that it may cause a new player to play the big blind.

After the user has successfully logged in, he is generally presented with an option to choose the type of game he wishes to play, and he may be connected to the software of the chosen game which displays game information at the user's access element 14. This information may be a summary listing the number of tables and players involved in that particular game or, under a typical online format, a list of active tables, some of which may have open seats. In the transfer table format, when a player selects a game to play, the player's identification is placed in a queue, e.g., a New Player Queue, as discussed below so that he will be transferred to another table with an available seat or sent to a new table with other new players. When a player is presented with the table screen, the screen may display other players 16 who may be accessing gaming system 12 through other access elements 14 from, for example, different geographic locations. In some cases, each player may be identified by their respective login name. There may be an image of a stationary dealer at the table who deals but does not play.

As a particular hand of play begins, the cards may be dealt electronically. A randomizing algorithm may be used to shuffle the cards, so the play may be faster than a normal manual game in which the cards must be physically shuffled. In some embodiments, an active player may view or see his cards on a screen of his access element, and each player may act on his hand in clockwise order. A player may immediately decide, based on his hand of cards dealt to him, whether to continue play. It is not typical for all players playing a given dealt hand to stay to the end of the hand until a winner is determined. If, at a point of time after the hand is dealt, a player determines that his hand is insufficient to warrant playing further, he can exercise an option to not play his hand. This is typically called "folding." Typically, once a player folds he waits until the hand is played out (for example until a winner is determined) and then may play the next hand at the table.

In particular embodiments, once a player folds at a given table, the player may be moved to another table (e.g., a new group of players) via a queue or otherwise to play a new hand with the new group of players without the folding player having to wait until the end of the hand at the table at which the player folded before continuing play. The player's new table may comprise other players who have folded at the same or different tables, players who have finished out a hand at the same or different tables and/or new players just beginning a gaming session. In some cases players such as those who have just folded at a given table may be moved into a queue by queue process 56 to wait until there are enough players in the queue to start a hand at a different table. Players in a queue may be allowed to watch a hand at which they just folded while waiting for a seat at another table where a new hand is about to start. When the queue comprises enough people to form a table with a desired number of players, queue process 56 will display a new table screen for each player showing the player seated with other idled players from the queue. In particular embodiments, players in a queue may not be able to see the queue or any information associated with the queue, such as their location in the queue and the identification or number of other players in the queue.

In an embodiment, three queues are used. A first queue is used to identify active players that have previously played a hand and are waiting for a new hand. A second queue contains players wishing to transfer tables, and a third queue identifies new players ready to play a first hand. Furthermore, each queue may utilize different techniques to seat a player. For example, active players and observers may be seated by rotating the button one seat counter-clockwise at the end of a hand. Tranferring players may be seated at the best open seat based on whichever one played it the least in terms of percentage. New players can be selected according to FIFO from their queue and sent to the remaining seats, resulting in a random seating.

Figure 3:
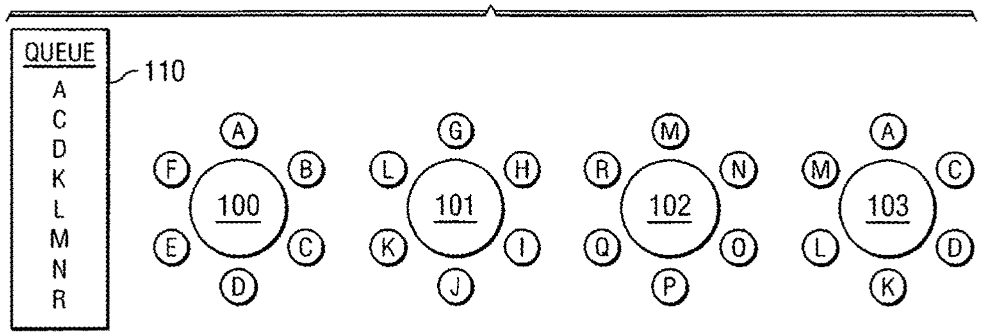
FIG. 3 illustrates example functionality of a queue process, in accordance with a particular embodiment.

As a general example in operation of queue process 56, FIG. 3 illustrates a plurality of virtual tables 100-103 of gaming system 12. Tables 100-102 each comprise a collection of players playing a given poker game such as those mentioned above. Table 100 includes players A-F, table 101 includes players G-L and table 102 includes players M-R. While six players are illustrated as playing at each table, it should be understood that tables in various embodiments may include any suitable number of players, and embodiments may include tables having different numbers of players while still incorporating the functionality described herein.

Assume for this example that hands are dealt at tables 100-102. At table 100 players A, C and D fold after reviewing their initial, dealt hand. They may fold at any suitable time, such as when their turn to bet arises at the table. Players A, C and D may then be placed in queue 110 to wait on enough additional players to form another table. At table 101 players K and L fold and are placed in queue 110. At table 102 players M, N and R fold and are placed in queue 110. This folding may occur, for example, at any time during the current hand at that table. In some cases it may occur after multiple rounds of betting and after additional cards have been dealt in a hand.

Thus, queue 110 comprises players A, C, D, K, L, M, N and R. For purposes of this example, assume that this embodiment operates on a first-in, first-out (FIFO) basis. Therefore, if players folded and were placed in queue 110 in the order illustrated (e.g., A, C, D, K, L, M, N and R) then they would be removed from the queue to join another table in that order. When players are pulled from the queue to form a table, their game status may change from idle to active. Assume that a new table formed from those in the queue also needs to comprise, according to the game options, 6 players. As a result, players A, C, D, K, L and M are joined together to play a new hand at table 103. Players N and R may remain in the queue to wait on enough additional players to join another table.

The remaining players at tables 100, 101 and 102 may play out their respective hands. When a remaining player from any of those tables folds, he may be placed in a queue, such as queue 110 or a different queue, for joining another group of players to play a new hand. Once the outcomes of the respective hands at tables 100, 101, and 102 are determined, the players remaining at those tables may be joined at their tables by other players from a queue or otherwise to play a new hand or they may be placed into a queue, such as queue 110, for joining another group of players to play a new hand.

Particular embodiments may utilize any number of tables having any suitable number of players at a given time. For example, with a large number of users 16 utilizing gaming system 12, a large number of tables may be used. As indicated above, some tables may begin hands with different numbers of players. Particular embodiments may also utilize any number of queues for holding any number of players. Each queue may be designated to hold one or more respective categories of players. In particular embodiments, the number of tables and queues may be set and changed dynamically as the number of players changes in order to provide action that reduces wait time for players so that the action and move to different tables appears almost seamless to the players. For example, a player who has just folded or otherwise completed a hand at one table may be moved to another table. To the player, the move to another table may appear almost seamless even though gaming system 12 may have actually placed the player in queue and pulled the player from the queue for placement at the other table according to the queue and seating processes of the system. In some cases gaming system 12 may not notify the player that he was actually in a queue waiting on a new table to be formed. In some embodiments the selection of which of a group of different tables to move the player to may be made randomly or using any desired criteria.

Players may be pulled from queues in any desired order, such as FIFO or in another desired manner. For example, players having a higher priority with gaming system 12 (e.g., as determined by play, bankroll, payment or otherwise) may be pulled from a queue to join a new table before another player having a lower priority. In addition, the pulling of players from queues may be done strategically by gaming system 12 to achieve desired outcomes (e.g., to speed up or slow down certain players). In some cases players may be pulled from the queue in random order.

In some games such as Hold 'Em and other poker games, a player's location at a table with respect to the "button" is important for a given hand. The button typically rotates one slot around the table for each hand, typically in the same direction as the betting direction. When in a given game a player is identified as a dealer and such identification rotates through the players, the button typically corresponds to the player identified as the dealer. After the first round, the person to the left of the dealer or button bets first and betting moves in a clockwise direction. Subsequent rounds of betting proceed in a similar manner. Thus, the person on the button or dealer's seat has an advantage, because he acts last, after the other players have taken their turn.

In some games such as "Hold 'Em," seat one, just to the left of the dealer or button, is referred to as the small blind, and seat two, just to the left of seat one, is referred to as the big blind. These blind seats are treated differently from the rest of the seats, because the blinds have to ante before they are dealt their first cards. The rest of the players in seat three through the last seat at the table, referred to as the dealer's button, may fold without anteing after they have seen their initial cards. The big blind ante is more of a disadvantage because it is larger than (e.g., normally twice the size of) the small blind ante. In some poker games, when a player plays his first hand, he has to ante the same amount as the big blind. Putting up an ante equal the big blind may be is called "posting," which is similar to an entry fee to the game.

Thus, being situated one spot or two spots to the left of the dealer or button may be a disadvantage for a given hand since players may have to bet without having seen their cards. As suggested above, the further away a player is located from the left of the dealer or button when betting proceeds in a clockwise direction then the greater the advantage for a given hand.

In particular embodiments the seat location with respect to a dealer or button of folding players placed in a queue is associated with the players so that it can be used, for example by seating process 54, when placing the players at a new table. Memory module 60 may store, for example, statistics that include how frequently each seat has been played and the last seat played associated with the player in the queue. Memory module 60 may use the player statistics and data to determine where each player should be seated in order to insure that the players are seated fairly. For example, if a player who just folded from the dealer or button position at a table is placed into a queue, gaming system 12 may place the player at a new table for a new hand at a location that takes into consideration how relatively frequent the player has played the button seat with respect to the other player's statistics. Similarly, a folding player who just posted the big blind ante before folding at a previous table may be placed at a new table at the small blind location for the next hand if he has played the small blind less frequently than the other players. A player may not always be placed at a new table at a location one spot over from the player's previous location at a previous table at which he just folded. Gaming system 12 may implement any suitable methods, procedures or seating processes for locating folding players at new tables. For example, in some cases gaming system 12 may utilize circumstances other than the player's previous location at a previous table when determining where to place the player at a new table.

In some embodiments, a player may remain at the same table. For example, if a player has remained at a table to the end of a hand, either playing the hand or observing the hand (as discussed below), the player may remain at the current table and players from the queue 110 may be added to the table to play another hand.

In particular embodiments, to provide continuity from hand to hand, each player's screen display of their current table may have the seats rotated so that the player always appears at the same physical location on his table screen. This seat rotation function could be executed at gaming system 12 like other functionality discussed herein, or at the player's access element 14.

In particular circumstances, situations may arise where several players may be in the queue who have previously played the identical seat number. Any suitable method may be used to determine which player is granted the next clockwise seat number. For instance, if several idled players came from seat four at different tables and they were queued to potentially be seated in seat number three, then in some cases where all relative player statistics were the same a FIFO based seating algorithm may be used. A timestamp associated with the player in the queue may be used to resolve contention issues. For example, if two players have the same relative player statistics, if the seating takes place clockwise from the earliest seats, the player with the earliest timestamp may be assigned the open seat, and the other player may wind up at a subsequently assigned seat. The timestamp may also be used to condition selections, such as to give a new player more of an opportunity to first play the big blind. For instance, setting a new player's timestamp to represent a date several months before the actual game date may cause his entry to be selected prior to already active player's entries.

Particular embodiments may utilize similar or other methods or factors in seating players. An example of one seating process that may be used that includes some of the functionality discussed above follows. For example, when a player folds or finishes an active hand, if the player has finished playing one of the blind seats, the hand process will save statistics such as the timestamp of when the player last played the blind seat in the player's record in the player-game file. Statistics and queues may be maintained for a player relative to the game, each round of a game, and relative to the player's seat assignment. These statistics may be used to reduce the possibility that a player will replay either blind more frequently than other players who are seated at the table. These statistics may be maintained, for example in memory module 60, as components associated with the player-game file and the queue.

Continuing the example, gaming system 12 may use the player-game statistics to determine the seating a new table where the players may be seated together for the first time. When the queue includes a sufficient number of idled players to constitute a new table, an evaluation process may be used to seat the big blind before seating the small blind. Blind selections for the players may be by lowest relative percentage of seating at the blind seat with the earliest seat timestamp . As indicated previously, the player seat timestamp may mean that the player has recently played that location. In a case where all queued players have the same relative statistics, the system may have to seat the player with the earliest seat timestamp regardless.

Continuing the example, after both blinds are seated, a similar evaluation process may be used to seat the button seat signifying that the button holds some seating distinction when compared to the remaining seats. Similar to the use of player statistics and the player seat timestamp to determine blind seating, the same approach may be used to distinguish the other seating such as the button. The player with the lowest relative percentage of activity at a seat number and the earliest seat timestamp may be assigned the button seat. If all players have already played the button and have the same relative player-game statistics, then the player with the earliest seat timestamp may be seated at the button seat.

The assignment of the remaining seats, from seat three clockwise to the seat before the button, may be like that of the blinds, using the player-game statistics and the earliest seat timestamp.

As another example, players entering the game for a first hand may be treated differently than players already in the game (e.g., players having already played at least one hand). In one embodiment, the system above is utilized to seat players already in the game to play the second, third, fourth, etc. hand using, for example, a Player Transfer Queue. New players waiting to play a first hand may be placed in a separate queue, e.g., a New Player Queue, and seated when a sufficient number of new players to begin a new table are waiting to enter the game. Players from this queue may also enter the game to replace a player that has left the game to maintain full tables. For example, if there are 30 players playing a six-player ring game, there are enough players for five full tables. If one or more players exit the game, players new to the game may be added to maintain sufficient players for full tables.

Players new to the game may also be added to provide a desired speed of play. Following the above example illustrated in FIG. 3 in which originally there are three tables 100-102 of a six-handed game. If three players on each of the three tables fold such that each table is reduced to a three-player hand, then three players from each of the tables 100-102 are added to the queue 110, for a total of nine players in the queue 110. In this instance, six of those players may start a new hand at a new table, e.g., table 103, leaving three players in the queue 110. Rather than waiting for three more players to fold or finish a hand, new players may be added to the game to allow a new hand to be started. The number of additional players to allow may be adjusted to achieve the desired rate of play. Furthermore, it may be desirable to allow a hand to be played with less than a full table, such as 5 players in a 6-player game.

As indicated above, some games provided by gaming system 12 may not have the concept of pre-defined blinds or the button. For example, in seven card stud, all players ante the same amount, and on the first betting round the player with the lowest face card is treated like seat one. The player with the low face card bets either a small ante or a big ante amount, and then player responses rotate clockwise from his seat. In this case, players may be seated similar to the rules used for non-blind seats, where players are seated clockwise using the player-game statistics and the player seat timestamps to determine the fairest seating arrangement. Exceptions for the blinds and the button may not be utilized in some embodiments.

In some traditional games, if a player sits out for a couple of rounds of play, he is not penalized. If he attempts to sit out longer, his chips may be removed from the table, and a new player may be seated in his place. Then, when the first player returns and reenters the game, he has to again post the big blind. In particular embodiments, however, there is no concept of sitting out of a hand, because players who are taking a break are removed and placed in a paused status and their seat is made available to players transferring to another table. Therefore a returning paused player with an existing account 62 in memory module 60 may be seated just as if he had remained active. The lobby process 52 may insert player's identification in the Player Transfer Queue 62 and change his status from paused to active.

Particular embodiments thus provide seating processes and algorithms that are simple, flexible, and robust. Given fair and robust as a general seating criteria, more than one algorithm exists which would yield satisfactory seating results. For example, in particular embodiments for each player a count of how many times he played a particular seat may be kept with the timestamp of the last time he played the seat. Whenever a player logically restarts in play, such as a player who completes a tournament and restarts his play in another tournament, the system may use fair and robust algorithms to reset the player-game and seat timestamps in particular embodiments. For another example, in particular embodiments the players may be seated in a clockwise fashion from the left of the button by comparing the player's percentage seating ratio for each particular seat and seating the player with the lowest ratio. For instance, for a 9 handed game, to seat the first seat each player's seating ratio will be compared and the player with the lowest seated ratio will be seated. The seated player is removed from the subsequent comparisons as seating continues clockwise using the same approach of selecting the player with the lowest seating ratio for the next seat.

The ability to move the folding player's identification to the Player Transfer Queue for subsequent placement at another table gives designers unique options to enhance the quality of action. In some cases a player may be allowed to fold out of turn and immediately go into another hand. When he folds out of turn, his entry may be inserted in a queue 66. To avoid other players at the old and new tables detecting this, the system may disguise (e.g., at player access elements 14) the player's name or other identifier and money or points amounts at the new table while the player still appears to be active at his prior table, waiting his turn to fold. When there are many active tables, as might be the case in a large tournament, this precaution may not be as beneficial.

As an example, if the gaming system 12 is waiting for a response from a player at seat three, if a player in seat nine elected to fold out of turn, the queue process may immediately put an entry for that player in a queue 66. From there the player may be assigned a seat at the next available table. Since his original seat may still appear to be active, to keep players who are viewing multiple different screens from knowing that a particular player has folded early, the early folding player game name and amount of money or points he is playing may be temporarily changed at the new table.

In addition, when a player is moved to another table (for example, after folding or otherwise completing a hand at a previous table), the player's name or other identity presented for view by other players may change. For example, a player may be playing as "charlie" at one table and may fold. Gaming system 12 may send the player to another table (for example through a queue process in some cases). At the new table, gaming system 12 may display another name for the player, such as "bill." Changing players display names when they change tables makes it less likely that other players can determine the changed name player's true identity. This can reduce the chance that other players can learn the changed name player's playing style.

As described herein, particular embodiments provide the positive consequences of seamlessly increasing the action. In particular embodiments when the number of players for a particular game is very small (e.g., between two and four), locating folding players at a new table may be of less benefit. At a level of five players, however, three people could be seated at a new table. As the number of players increases, the number of seats can be ramped up to an optimum number. For example, no-limit Hold 'Em is generally played with nine players. When there are seven players, four could be seated at a table in order to provide the ability to move players to a queue for placement at a different table upon folding. With nine players, five could be seated. At eleven players, six could be seated. This could continue until seventeen players are participating, and then the seating could be set to the maximum of nine. Conversely, when the number of players falls into the low ranges, the maximum seating may be ramped down in order to keep providing the functionality described herein.

The methods discussed herein are ideal for large multi-table tournaments because they may greatly speed up the action. Since some players attempt to play slower in tournaments in order to survive longer, in order to balance out the number of hands played by each player, the gaming system 12 may force faster players to wait for the completion of hands. For example, faster players may have to wait for completion of a hand at their current table upon folding instead of being sent to a queue for placement at a new table. In addition, the faster players may be pulled from an idle player queue more slowly than other players in an effort to slow down the faster players. Slowing down faster players may be used in conjunction with a penalty for slower players. The total amount of money anted as blinds by each player may also be used to help determine which players may need to be slowed down or sped up.

With respect to some games, seating methods discussed herein may reduce the need for certain graphic displays and may simplify a lobby screen. For example, since players at tables may change constantly, there may be no permanent tables to be displayed in some embodiments, and a player does not have to wait and/or contend for a seat at a table. For example, in some embodiments when a player selects a game type, instead of being displayed a list of tables, he may automatically be seated when his entry becomes active in the queue.

In particular embodiments, players have less of an opportunity to become familiar with the style or characteristics of play of the other players as may be the case with other, traditional games in which players play multiple hands at the same table. Players may not be able to “read” or get “tells” as to whether a player is a good or poor player. They will not have a mental history in order to know if the player is an aggressive bettor or a conservative caller. This will take away a huge advantage of many great players. To reduce the effect of this disadvantage, some embodiments may display information to help define a player’s skill level.

As an additional advantage, particular functionality discussed herein allows dealer’s choice games to occur more efficiently. Frequently dealer’s choice games are played in home poker games. One player may choose to deal Hold ’Em, another player may choose to deal Omaha High and still another player may deal Seven Card Stud. Since the maximum seating for Seven Card Stud is eight players, if the number of players is greater than eight, then Seven Card Stud cannot be dealt without having one player sit out of the hand. The same may be true for traditional online poker games. However, in embodiments discussed herein, the maximum size of the table may not be a restraint allowing a “dealer” player to choose any suitable game. Since gaming system 12 may control the seating of players (for example, from a queue 66), players may be seated at various sized seating arrangements to satisfy a particular requirement for a game chosen by a dealer player.

In a related situation, some online poker games seat the same type of game differently. For instance, one site may seat no-limit Hold ’Em with nine players, and another may seat it with ten players. Using the functionality described herein, gaming system 12 may offer a dealer’s choice where the dealer has the option to establish the seating differently for a particular type of game, such as no-limit Hold ’Em. For example, a player identified as the dealer may select a game to play as well as a number of players for the game. The queue can then fill the table with waiting players according to the number of players preferred by the “dealer.”

As indicated above, gaming system 12 may keep game and player records and history. Play review process 58 allows player to go back and see how one or more particular hands were played. These hands may include hands that the player was involved in or hands of other players. History 70 may store the relevant game play information to make this possible. A player who just folded or otherwise completed a hand may be allowed to go back and review that hand. In particular embodiments, the gaming system may allow the player to see the cards of all other players in the hand to see their playing style. While allowing a player to view other player’s actual play may not be advantageous in traditional card games, the functionality of particular embodiments to move players across tables to play with a multitude of players in a given session may make it less likely that the reviewing player obtains any advantage of the player whose play was reviewed. In some cases gaming system 12, for example through queue process 56 and/or seating process 54, may ensure that those two players are not placed at the same table in the future. In addition, changing a player’s screen name or identity across sessions or tables also may reduce or eliminate any advantage to be gained by a reviewing player on a player whose hands are reviewed. Moreover, gaming system may associate an alias with a player whose play is being reviewed.

In some cases gaming system 12 may associate a skill level with players whose play is being reviewed. For example, a novice player may desire to view play of a highly skilled or “expert” player. Gaming system 12 may present historical hands played by highly skilled or expert players for view by the novice player.

In some embodiments players may be able to view historical hands played at any point in time. This would be inefficient in games where everyone sits and plays at the same table because the other players at the table may want to wait while one player is reviewing historical hands. Moving players across tables, however, enables a player to stop playing and view historical hands or perform other tasks. For example, after folding or otherwise completing a hand a player may elect to review hands or other information provided by gaming system 12 instead of being immediately joining another table or being placed into a queue to join another table. In some embodiments an active player may be able to review historical hands or other gaming system information while playing, or he may also do this while in a paused state. When a player decides to sit out of a hand and go to the paused state, in some embodiments he will not be shown as “sitting out” at a table because he will not appear at any tables, and a seat will not be assigned to him until he returns to the game.

In particular embodiments gaming system 12 may provide players with the ability to report other players as possibly cheating. Allowing a player to go back and review a hand that was played while viewing each players’ cards may facilitate the identification of cheating play on the part of one or more players who were playing the hand. Once gaming system 12 receives a report of a possible cheating player or incident, it may automatically or through associated personnel review the play to take appropriate action.

Figure 4:
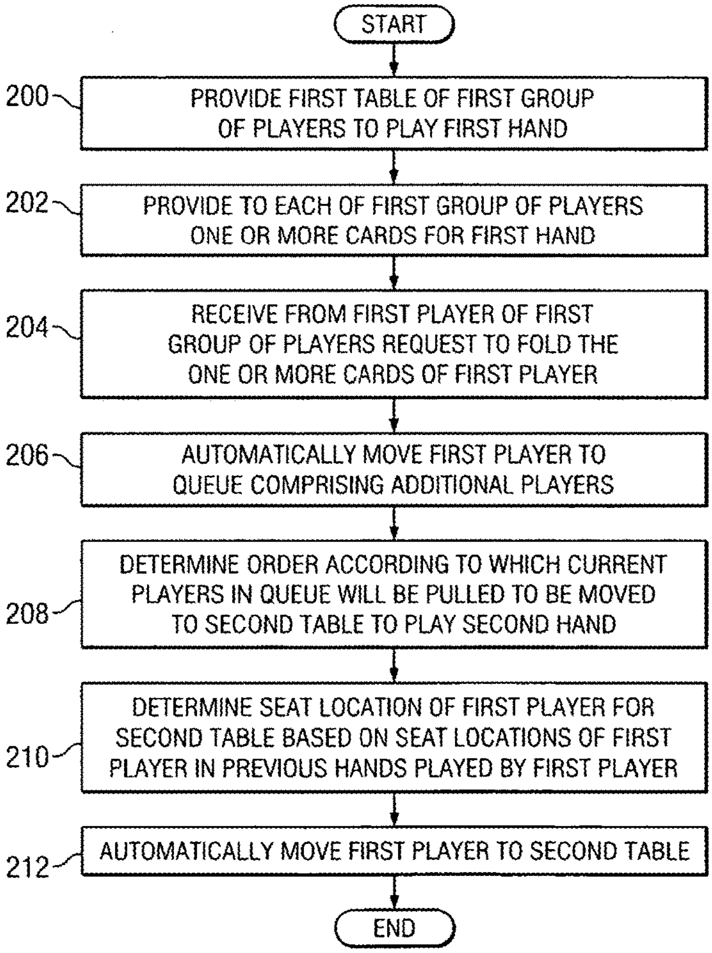
FIG. 4 is a flowchart illustrating a method for computer gaming, in accordance with a particular embodiment.

FIG. 4 is a flowchart illustrating a method for computer gaming, in accordance with a particular embodiment. The method begins at step 200 where a first table of a first group of players is provided to play a first hand of a game, such as a poker game. In particular embodiments, each of the first group of players may be accessing a gaming system over one or more communication networks. At step 202, one or more cards are provided to each of a first group of players for the first hand. The cards may be dealt by a gaming system randomly in some embodiments.

At step 204 a request is received from a first player of the first group of players to fold the one or more cards of the first player. This request may be received, for example, by the first player transmitting a fold request using an access element associated with the first player. In some cases the first player may transmit instructions regarding how to play various hands to a gaming system (e.g., before game play in some situations). Thus, the request to fold in various situations may be encompassed in these instructions, and the gaming system may follow these instructions to fold the first player's one or more cards in applicable circumstances. In particular cases the first player may be folding at step 204 well into a hand after one or more rounds of betting, such as after the flop or river card in Hold 'Em.

At step 206, the first player is automatically moved to a queue comprising additional players. For example, in response to the folding the first player may be moved to a queue so that the first player may be joined with other players at a new table to play a new hand without having to wait on the conclusion of the first hand at the first table. This may be performed without a specific user request at that time to move to a new table. In some cases a gaming system may prompt the first player when he folds whether he wants to move to a new table to play a new hand without waiting on the conclusion of the first hand at the first table.

At step 208, an order is determined according to which current players in the queue will be pulled to move to a second table to play a second hand. The determined order may comprise any suitable order, such as a FIFO order. In some cases, players may be pulled according to a priority associated with gaming system 12 (e.g., higher wagering players may be pulled first). In some cases players may be pulled according to seat location. For example, if it is desired that a given player sit at a particular location at a new table, then that player may be pulled to sit at such location at the new table before another player who is associated with a next seat location that has already been assigned at the new table.

At step 210, the seat location of the first player for the second table is determined based on seat locations of the first player in previous hands played. For example, if the first player just played at the big blind spot in Hold 'Em at the first table, then his seat location at the second table may be determined to exclude the big blind spot. At step 212, the first player is automatically moved from the queue to the second table to play the second hand. One or more other players at the second table may be different from those players who were at the first table with the first player. The movement to the second table may occur without specific user request at that time. In some cases, the first player may not even know that he spent time in the queue. In addition, his movement from the first table to the second player may appear seamless.

Some of the steps illustrated in the flowchart of FIG. 4 may be combined, modified or deleted where appropriate, and additional steps may also be added to the flowchart. Additionally, steps may be performed in any suitable order without departing from the scope of the invention.

As discussed above, in some embodiments a player may be transferred rapidly from table to table as the player folds undesirable starting hands given a specific starting position. As a result, a rate of play, e.g., the number of hands played over a given period of time, may be higher than desired. The rate of play in online poker games may be either too slow or too fast to suit many of the player's style of play because players have only one choice of speed—they can play in a slow game where they continuously stay at the same table, or they can play in a fast game where they are always moved to new hand at a new table when their action is complete.

In an embodiment, a player may designate a rate of play. For example, in an embodiment, a player may designate a rate of play as a percentage of a full rate of play, wherein the full rate of play, e.g., one-hundred percent, may represent the rate of play obtained by being transferred to a new table and/or hand upon folding or requesting to transfer to another hand. Slower rates may be represented by a percentage between zero percent to ninety-nine percent, wherein the percentage represents the frequency or percentage of hands the player may be transferred upon folding or requesting to transfer to another hand. For the remainder of hands, the player remains at the table until the hand has been completed by all players.

For example, in an embodiment a rate of play of fifty percent may result in the player being immediately transferred to a new table and/or a new hand every other hand on average. As another example, a rate of play of twenty-five percent may result in the player being immediately transferred one out of every four hands on average. As yet another example, a rate of play of seventy-five percent may result in the player being immediately transferred three out of every four hands on average. Other percentages and rates of play may be used.

In other embodiments, the rate of play may be expressed as an average number of hands per unit of time, such as an average rate of play of 150 hands per hour. In this embodiment, the gaming system 12 may transfer the player after folding to maintain the specified average number of hands per unit of time.

It should be noted that the above rates of play are an average and that in an embodiment the gaming system 12 may take into account the actual play or the hands played by the player. For example, if a player has specified a desired rate of play of seventy-five percent (e.g., immediately being transferred three out of four hands) and the player played the previous hand into the later rounds of betting or until the hand was completed, the system may take this play into account by, for example, considering the previous hand as the one hand of the one out of four hands in which the player would not be transferred on folding.

As another example of how the gaming system 12 may take the actual play into account, in another embodiment the gaming system 12 may take into account the length of play for a hand or a set of hands. For example, a player may play a hand or hands into the later rounds of betting, such as playing a hand to the turn or the river in Texas Hold'em, and as a result spend a relatively long period of time on those hands. In these situations, the gaming system 12 may in an embodiment consider this play in determining whether or not to transfer the immediately. In the example given above in which the player played a hand or hands into later rounds, the system may transfer subsequent hands, thereby maintaining an average transfer rate.

Figure 5:
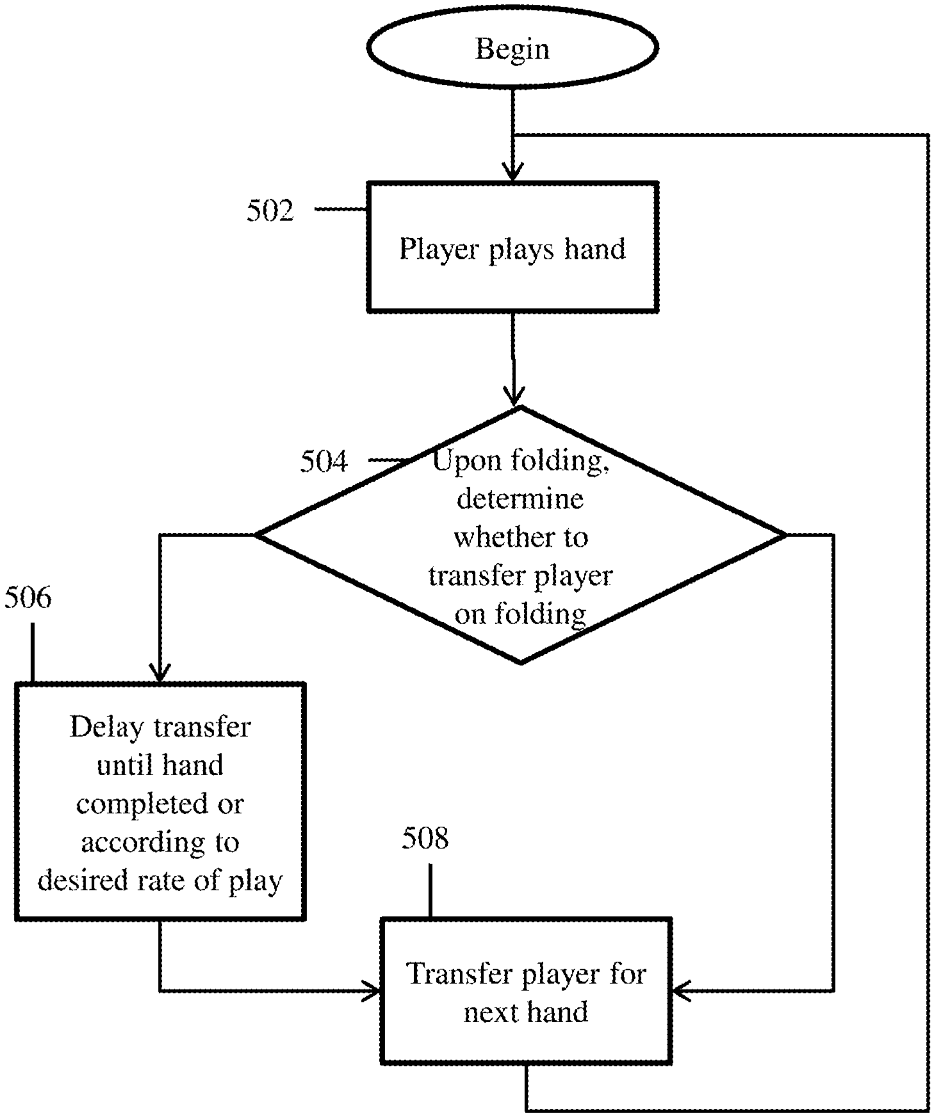
FIG. 5 is a flowchart illustrating a method of a player rate in accordance with an embodiment.

FIG. 5 is a flowchart illustrating a method allowing a player to control the rate of play in accordance with an embodiment. The processing begins in step 502, wherein a player begins to play a hand. If the player folds the hand at any point during the game, then the processing proceeds to step 504, wherein the gaming system 12 determines whether or not to transfer the player to a new table and/or hand, or to maintain the player at the current hand to observe the remaining players finish the hand. As discussed above, the determination to transfer a player may be dependent upon the selected rate of play and/or the player's play history.

If the determination is made to maintain the player at the current table, then processing proceeds to step 506, wherein transferring the player to a new hand and/or table is delayed until the current hand is played to completion by all players at the table or the player is ready to be transferred according to a desired rate of play. After play is completed and/or the delay time has expired to maintain a desired rate of play, the player is transferred to a new hand and/or table as illustrated in step 508.

If, in step 504, the determination is made to transfer the player upon folding, then processing proceeds immediately to step 508 without the delay illustrated in step 506.

The process then transfers to step 502 and is repeated.

In an embodiment, players completing a hand at a table or observing a hand at a table may either remain at the player's current table, at which additional players from the queue 110 may be added, or the players may be placed on the queue 110 to be placed at a different table. This ability to co-mingle players further allows the gaming system to allow players who have selected to stay at the same table, always observing, with players who elect to transfer at the end of the hand. This type of system accommodates a single type of game suitable for both types of players rather than providing separate types of games. If at the end of hand the table does not have a sufficient number of players to constitute a hand, the players may be placed in the transfer queue to be sent to the next available table. It should be noted that in some embodiments, a hand may be played with less than a full table, such as five players at a six player table.

Figure 6:
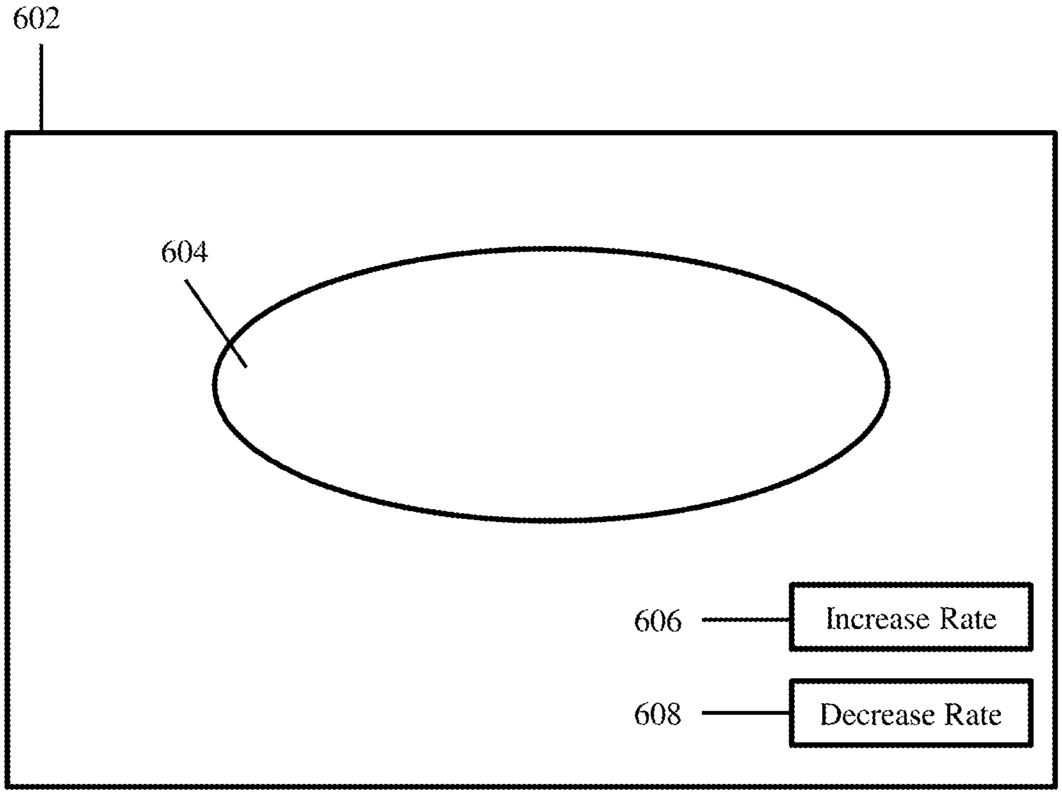
FIG. 6 illustrates a display including player rate controls in accordance with an embodiment.

FIG. 6 illustrates an embodiment in which the gaming system 12 presents the player controls to increase and decrease the rate in accordance with an embodiment. In particular, FIG. 6 illustrates a display 602 that includes an illustration of a game table 604 (other players are not shown) and an "Increase Rate" button 606 and a "Decrease Rate" button 608. Other buttons may be presented to the player. Selection of the "Increase Rate" button 606 by the player increases the rate or frequency that the player is transferred immediately upon folding a hand, such as increasing the percentage or increasing average number of hands to be played per hour discussed above. Selection of the "Decrease Rate" button 604 by the player decreases the rate or frequency that the player is transferred immediately upon folding a hand, such as decreasing the percentage or decreasing the average number of hands to be played per hour discussed above.

Figure 7A:
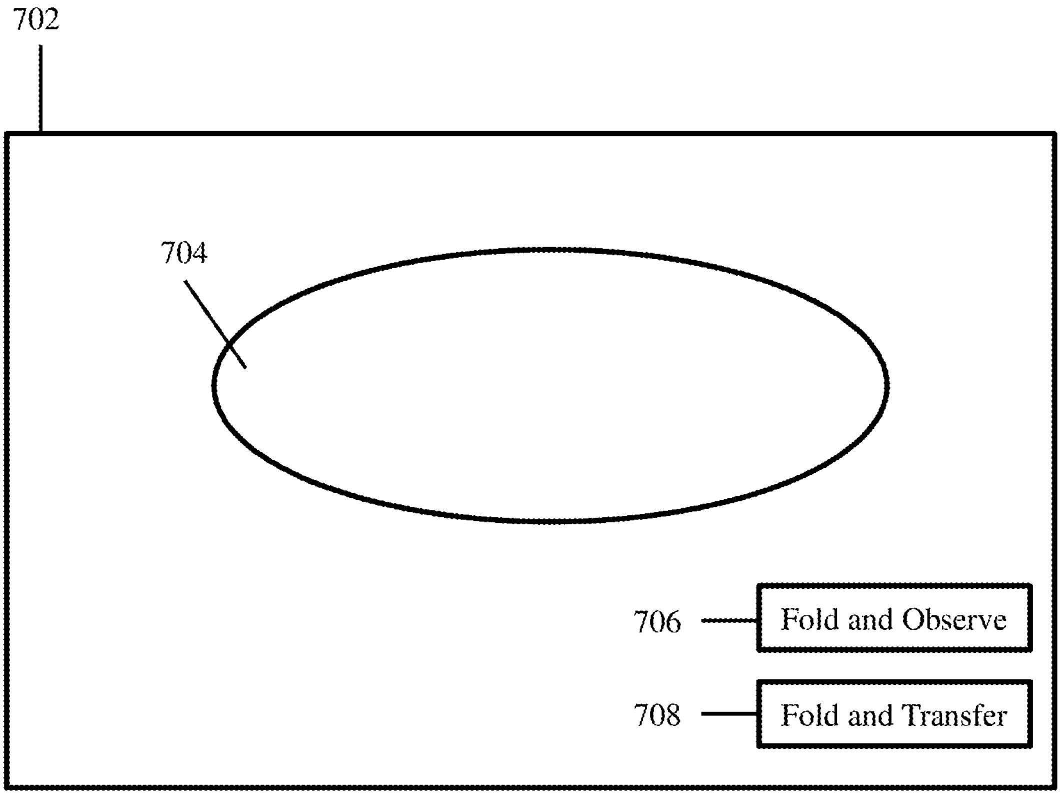
FIG. 7A and FIG. 7B illustrates a display including player rate controls in accordance with another embodiment.

The display 602 may include other elements. For example, the display 602 may include other play control buttons or controls, such as checking/raising/calling/folding controls, folding controls In another embodiment, the player may be presented controls, such as buttons, thereby allowing the player to control the pace of play hand-by-hand. For example, as illustrated in FIG. 7A a display 702 includes an illustration of a game table 704 and a "Fold and Observe" button 706 and a "Fold and Transfer" button 708. In this embodiment, selection of the "Fold and Transfer" button 708 by the player causes the player to fold and be transferred to a new hand/table using, for example, the method as explained above, if possible. Optionally, the player may remain at the current table if a new hand begins before the player is able to be transferred. On the other hand, selection of the "Fold and Observe" button 706 by the player allows the player to fold, but rather than being transferred immediately, the player remains at the current table and allows the player to observe the play of the remaining players in hand until the hand is concluded.

Although the embodiments discussed above are discussed as separate embodiments, other embodiments may be a combination of the embodiments. For example, in an embodiment a player may define a rate of play, such as a percentage or average number of hands per hour discussed above, and be presented with override buttons, such as the "Fold and Observe" button 706 and the "Fold and Transfer" button 708. In this embodiment, the rate of play may act as a default action, and the "Fold and Observe" button 706 and the "Fold and Transfer" button 708 may act as an override action. Upon folding, the player may be transferred according to the rate of play, unless the player folds by use of the "Fold and Observe" button 706 or the "Fold and Transfer" button 708. If the player folds by use of the "Fold and Observe" button 706, the gaming system 12 may not transfer according to the rate of play, but rather may keep the player at the current table, thereby allowing the player to observe the remaining players conclude the current hand. Similarly, if the player folds by use of the "Fold and Transfer" button 708, the gaming system 12 may not transfer according to the rate of play, but rather will transfer the play immediately.

Figure 7B:
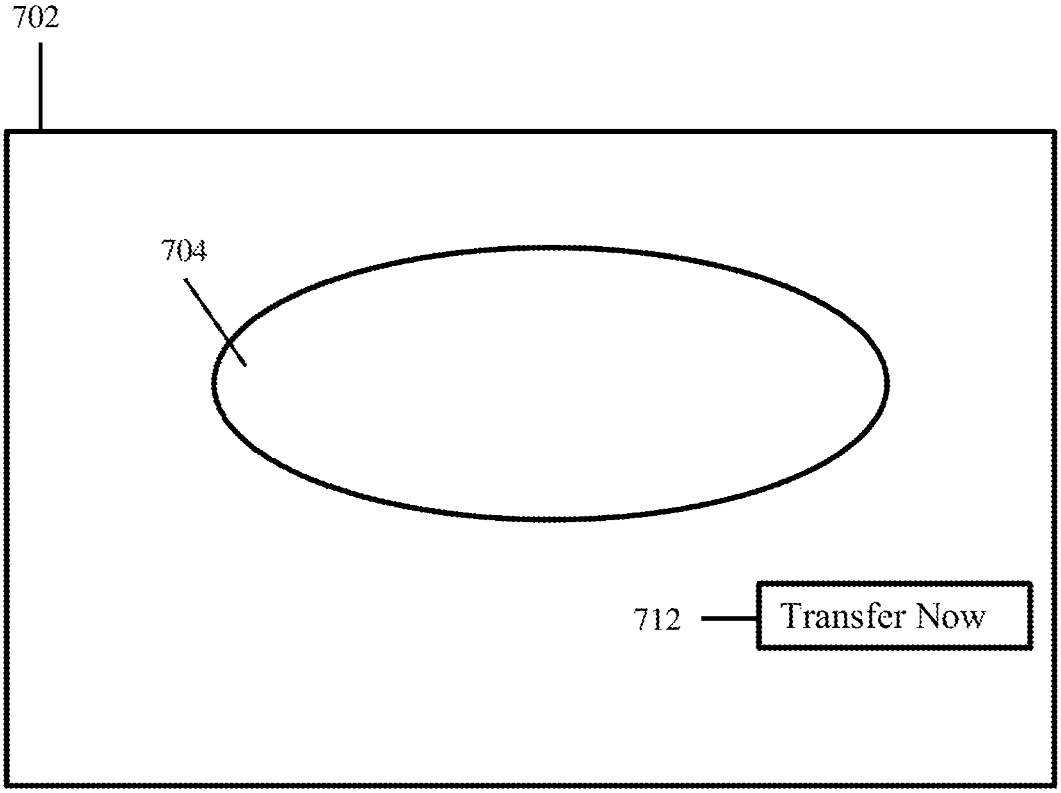

After selecting one of the "Fold and Observe" button 706 or the "Fold and Transfer" button 708, another embodiment may provide the user with override controls. For example, FIG. 7B illustrates a display 710 that provides a player a "Transfer Now" button 712. In an embodiment, the "Transfer Now" button 712 is presented to a player after the player has selected the "Fold and Observe" button 706, but has subsequently changed his/her mind. As an example, a player may initially have witnessed an active pre-flop betting cycle, but while the player decided to fold the player would like to observe the betting and/or play of the hand. After seeing the flop, however, the player may decide that he would not like to continue observing the play. In these situations, the player may select the "Transfer" button 712, causing the player to be transferred to a new hand at another table or a new table using, for example, the method as explained above. An option such as this provides a player that has chosen to observe the ability to increase the rate of play by subsequently selecting the option to transfer prior to completion of the current hand.

In an embodiment, the player's selections or actions may be used to determine the seating. For example, a new hand may be composed of players that were active in a hand and players observing that same hand. Players waiting to play a hand, e.g., players waiting in the queue 110, and/or new players to the game may be used to fill the table.

Figure 8:
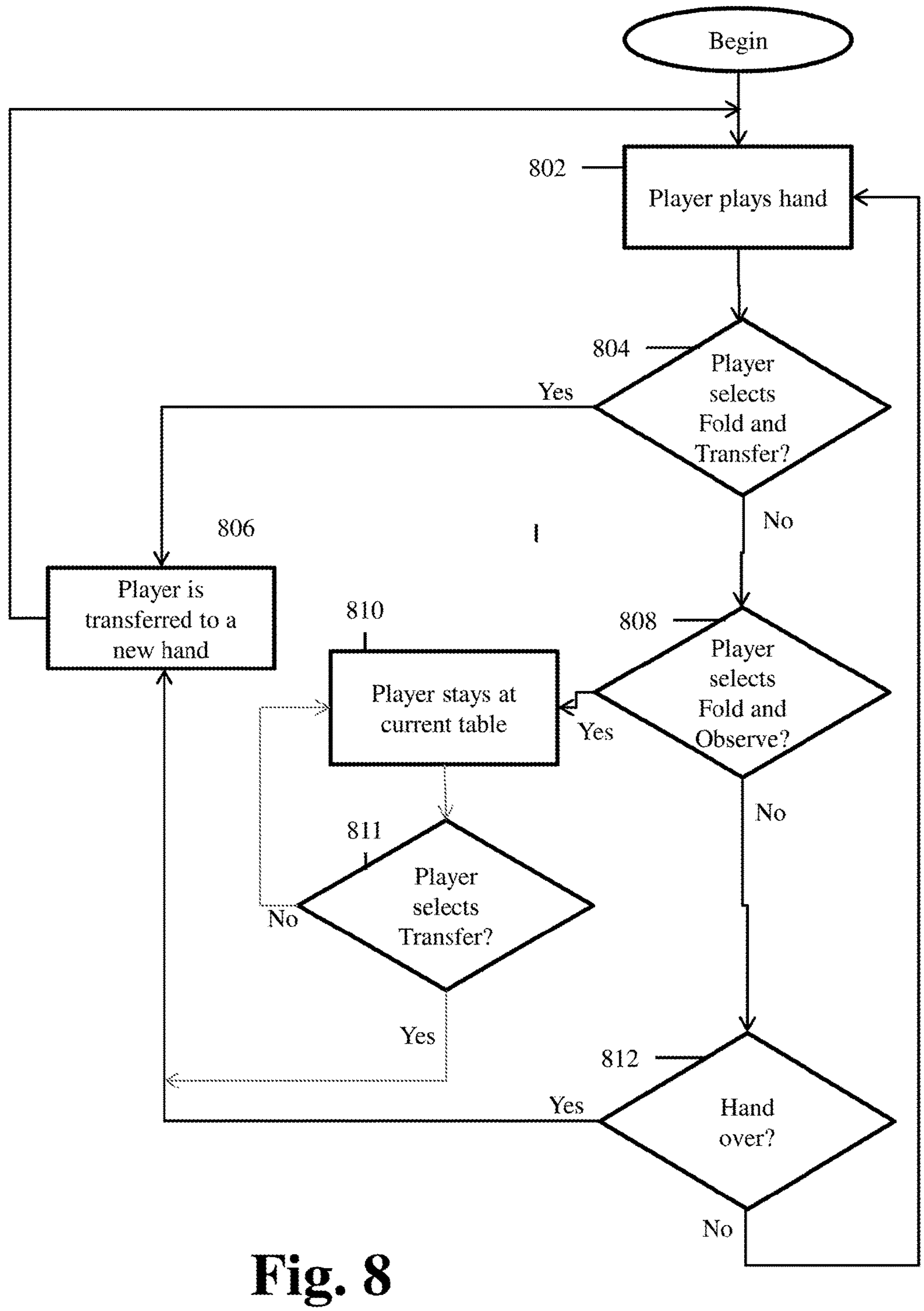
FIG. 8 is a flowchart illustrating a method for player rate control in accordance with an embodiment.

FIG. 8 is a flowchart illustrating a method of play using the player rate control using, for example, the controls illustrated in FIGS. 7A and 7B, in accordance with an embodiment. The processing begins in step 802, wherein the player plays a hand, such as being dealt two cards in a game of Texas Hold'em. Next, in step 804, a determination is made whether or not the player selected the "Fold and Transfer" button. If so, then the processing proceeds to step 806 wherein the player is transferred to a new hand and/or new table and processing returns to the beginning. If in step 806 it is determined that the player did not select the "Fold and Transfer" button, the processing proceeds to step 808, wherein a determination is made whether or not the player selected the "Fold and Observe" button. If the player did select the "Fold and Observe" button, then processing proceeds to step 810, wherein the player stays at the current table and is presented an option to "Transfer" as indicated in step 811. If the player selects "Transfer," then processing proceeds to step 806, otherwise, processing returns to step 810.

If in step 808, it is determined that the player did not select the "Fold and Observe" button, then the processing proceeds to step 812, where it is determined if the hand is over. If the hand is over, then processing proceeds to step 806 for the player to play a new hand. If the hand is not over, then processing returns to step 804.

It should be noted that the above examples are provided for illustrative purposes to explain embodiments and that other embodiments may utilize other techniques. For example, with regard to placing transferring players at new tables for another hand, multiple queues may be utilized. In one such example, each seat position may have its own queue, e.g., a seat one queue, a seat two queue, etc. When placing players for another hand, the top player of each queue may be selected to be placed at a table for another hand. In this embodiment, the gaming system may include logic when appropriate to prohibit or reduce the likelihood or the capability of seating two or more players at the same table in sequential hands.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a gaming system, these elements may be combined, rearranged or positioned in order to accommodate particular operational configurations or needs. In addition, any of these elements may be provided as separate external components to the gaming system where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A network-based gaming system comprising:

a server communicatively coupled to a first plurality of access devices, the server configured to:

receive a desired rate of play for each of a first plurality of players, each of the first plurality of players having a corresponding access device of the first plurality of access devices;

cause each of the first plurality of access devices to present a representation of one or more cards of a first hand;

receive a first communication from a first access device of the first plurality of access devices, the first access device corresponding to a first player of the first plurality of players, the first communication indicating a request to fold the one or more cards of the first hand of the first player; and upon receiving the first communication, causing the first access device to present a representation of one or more cards of a second hand according to the desired rate of play for the first player , the second hand being played by a second plurality of players, the second plurality of players being different than the first plurality of players, wherein the causing the first access device to present the representation of one or more cards of the second hand is based at least in part on a duration the first player is involved in the first hand.

2. The network-based gaming system of claim 1, wherein the desired rate of play corresponding to at least one player is defined as a number of hands per period of time.

3. The network-based gaming system of claim 1, wherein the desired rate of play corresponding to at least one player is defined as a percentage of a maximum number of hands.

4. The network-based gaming system of claim 1, wherein the server is further configured to cause the first access device to present a first option to the first player to increase the desired rate of play corresponding to the first player and a second option to the first player to decrease the desired rate of play corresponding to the first player.

5. The network-based gaming system of claim 1, wherein the server is further configured to:

cause the first access device to present an override option upon receipt of the first communication;

receive a second communication indicating selection of the override option; and upon receiving the second communication, automatically causing the first access device to present the representation of one or more cards of the second hand regardless of the desired rate of play for the first player.

6. The network-based gaming system of claim 1, further comprising the first plurality of access devices.

7. The network-based gaming system of claim 1, wherein the first plurality of players and the second plurality of players share a plurality of common players.

8. A network-based gaming system comprising:

a server communicatively coupled to a first plurality of access devices, the first plurality of devices including a first access device corresponding to a first player and a second access device corresponding to a second player, the server configured to:

receive a first desired rate of play for the first player;

receive a second desired rate of play for the second player, the first desired rate of play being different than the second desired rate of play;

providing the first access device and the second access device representations of one or more cards of a first hand;

receiving a first communication from the first access device that the first player folds while the second player remains in the first hand; and upon receiving the first communication, determining a delay period prior to automatically providing the first access device a representation of one or more cards of a second hand, wherein the delay period is determined to maintain the first desired rate of play and wherein the delay period is based at least in part on play of the first player in the first hand.

9. The network-based gaming system of claim 8, wherein at least one of the first desired rate of play and the second desired rate of play is a maximum rate of play, the maximum rate of play being a rate of play equal to a rate of play achieved by automatically being presented a new hand immediately upon folding.

10. The network-based gaming system of claim 8, wherein the server is configured to provide the first access device representations of play of the first hand during the delay period.

11. The network-based gaming system of claim 8, wherein the first desired rate of play is defined as a number of hands per period of time.

12. The network-based gaming system of claim 8, wherein the first desired rate of play is defined as a percentage of a maximum number of hands.

13. The network-based gaming system of claim 8, wherein the server is further configured to cause the first access device to present a first option to the first player to increase the first desired rate of play corresponding to the first player and a second option to the first player to decrease the first desired rate of play corresponding to the first player.

14. The network-based gaming system of claim 8, wherein the server is further configured to:

cause the first access device to present an override option during the delay period;

receive a second communication indicating selection of the override option; and upon receiving the second communication, automatically causing the first access device to immediately transfer the first player to a second hand regardless of the first desired rate of play for the first player.

15. A network-based gaming system comprising:

a server communicatively coupled to a first plurality of access devices, the first plurality of devices including a first access device corresponding to a first player and a second access device corresponding to a second player, the server configured to:

store in a memory a first desired rate of play for the first player and a second desired rate of play for the second player;

retrieve from memory the first desired rate of play and the second desired rate of play;

providing each of the first plurality of access devices representations of one or more cards of a first hand;

receiving a first communication that the first player requests to fold;

receiving a second communication that the second player requests to fold;

upon receipt of the first communication, determining when to present a next hand for the first player based upon the first desired rate of play, the determining being based at least in part on when the first player requests to fold during the first hand; and upon receipt of the second communication, determining when to present a next hand for the second player based upon the second desired rate of play, wherein the first desired rate of play is separate from the second desired rate of play.

16. The network-based gaming system of claim 15, wherein the next hand for the first player is different than the next hand for the second player.

17. The network-based gaming system of claim 15, wherein the server is further configured to cause the first access device to present an override option after receipt of the first communication and prior to presenting the next hand for the first player.

18. The network-based gaming system of claim 17, wherein the server is further configured to:

receive a third communication indicating selection of the override option; and upon receiving the third communication, automatically causing the first access device to immediately transfer the first player to the next hand for the first player.

19. The network-based gaming system of claim 15, wherein the first desired rate of play is defined as a number of hands per period of time.

20. The network-based gaming system of claim 15, wherein the first desired rate of play is defined as a percentage of a maximum number of hands, the maximum number of hands being equal to presenting a new hand immediately upon folding.

* * * * *